United States Patent
Bogdan et al.

[15] 3,650,695
[45] Mar. 21, 1972

[54] METHOD FOR TREATING TITANIUM DIOXIDE REACTOR DISCHARGE CONTAINING PRODUCTS OF NITROGEN FIXATION

[72] Inventors: John R. Bogdan; Alonzo Farmer, both of New Martinsville, W. Va.

[73] Assignee: PPG Industries, Inc., Pittsburgh, Pa.

[22] Filed: Aug. 28, 1969

[21] Appl. No.: 853,653

[52] U.S. Cl. ............................23/202 V, 23/87 T, 23/203, 23/219, 23/356, 55/71, 134/19, 134/42
[51] Int. Cl. ............................C01g 23/04, C01b 21/20
[58] Field of Search............23/202, 1, 203, 356, 219, 87 T; 55/71

[56] References Cited

UNITED STATES PATENTS

| | | | |
|---|---|---|---|
| 2,228,273 | 1/1941 | Klingelhoefer | 55/71 X |
| 2,393,229 | 1/1946 | Bouchard | 55/71 |
| 2,502,347 | 3/1950 | Schaumann | 23/202 |
| 2,508,271 | 5/1950 | Krchma | 23/202 |
| 3,131,028 | 4/1964 | Stow, Jr. | 23/215 |
| 3,275,411 | 9/1966 | Freeman et al. | 23/1 X |
| 3,275,412 | 9/1966 | Skrivan | 23/1 X |

OTHER PUBLICATIONS

Chemical Abstracts, Vol. 52, No. 20, 10/25/58, pages 16,968 and 16,969

Primary Examiner—Edward Stern
Attorney—Chisholm and Spencer

[57] ABSTRACT

Pigmentary titanium dioxide is produced by vapor phase oxidation of titanium tetrachloride with oxygen at elevated temperatures in a reactor. Gaseous and solid products produced by the reaction are separated and chlorine recovered from the gaseous portion in a chlorine recovery zone. Obstruction of the chlorine recovery zone by products resulting from nitrogen fixation is prevented by scrubbing reactor discharge gas with liquid chlorine, liquid titanium tetrachloride or liquid chlorinated solvents. Removal of the obstruction is accomplished by heating the chlorine recovery zone.

6 Claims, 1 Drawing Figure

Patented March 21, 1972
3,650,695
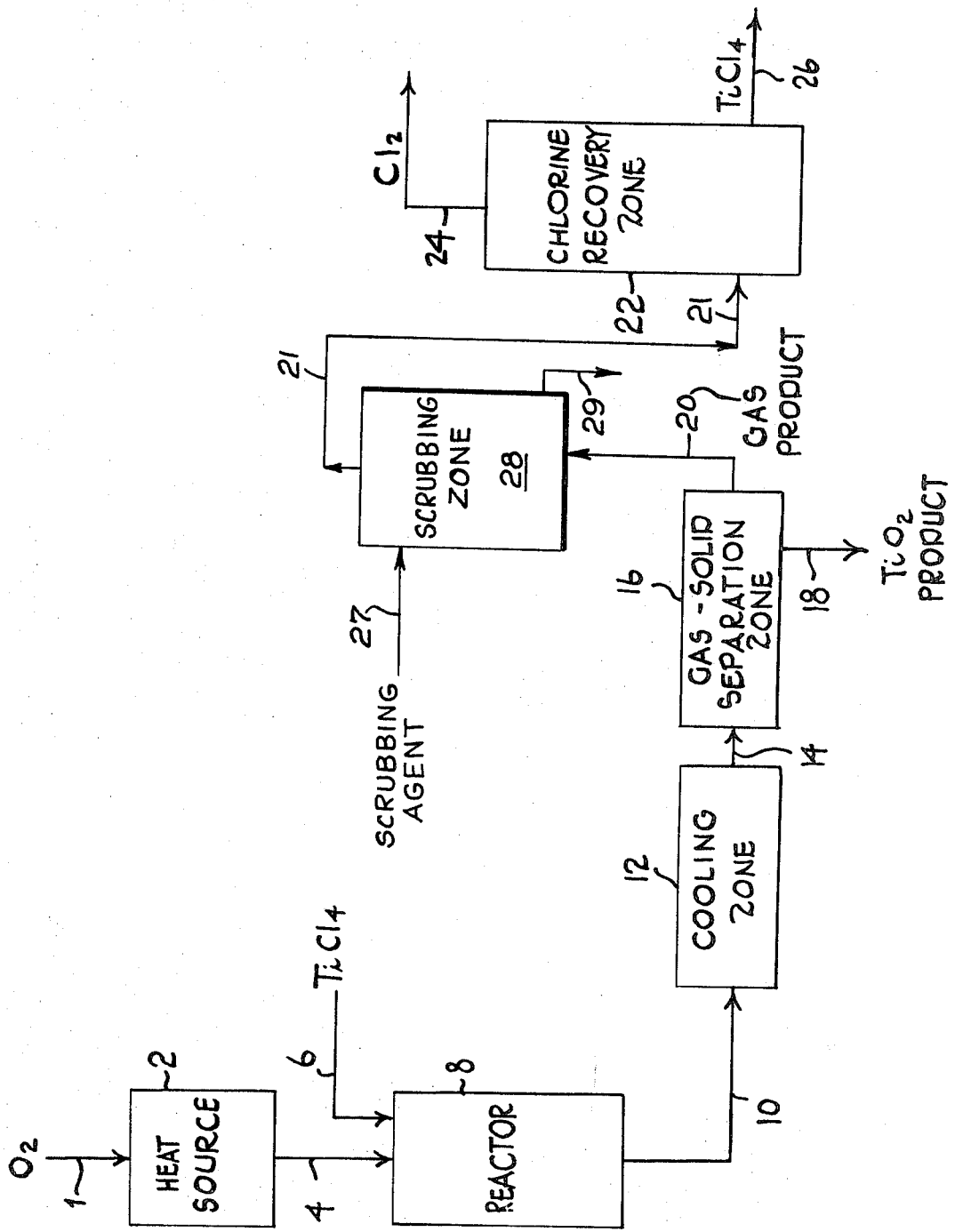
INVENTORS
JOHN R. BOGDAN
ALONZO FARMER
BY Chisholm and Spencer
ATTORNEYS

METHOD FOR TREATING TITANIUM DIOXIDE REACTOR DISCHARGE CONTAINING PRODUCTS OF NITROGEN FIXATION

BACKGROUND OF THE INVENTION

Pigmentary titanium dioxide is currently produced commercially by two principal processes. One such process, the chloride process, characteristically involves the vapor phase oxidation of at least one titanium halide, particularly a titanium tetrahalide selected from the group consisting of titanium tetrachloride, titanium tetrabromide and titanium tetraiodide at temperatures above 500° C., e.g., 900° to 1,500° C. Titanium tetrafluoride is not considered generally to be useful for this particular process. Titanium tetrachloride is economically preferred and is obtained typically by the chlorination of a titaniferous ore, e.g., ilmenite and rutile, in the presence of a carbon reductant.

The vapor phase oxidation of titanium tetrachloride produces titanium dioxide and chlorine in accordance with the following balanced equation:

$$TiCl_4 + O_2 \rightarrow TiO_2 + 2Cl_2$$

In order to improve the economics of this process, the chlorine produced therein is recovered and reused for the chlorination of further titaniferous ore.

Although the oxidation of titanium halide with oxygen in the vapor phase is exothermic, it has been found that the heat of reaction is insufficient to preheat newly introduced reactants from normal ambient temperatures to reaction temperatures and thus maintain the reaction on a continuous basis. The lack of efficient use of the heat of reaction has been attributed, in large part, to the removal of large quantities of usable heat by the titanium dioxide effluent product stream. Additional usable heat is lost by virtue of intensive radiation by the highly heated titanium dioxide product particles and by heat losses through the reactor walls. Consequently, it has been found necessary to supply heat continuously to the reaction zone in order to maintain the oxidation reaction on a continuous basis.

One method for supplying the required amount of heat to the reaction zone is to preheat separately the reactant gases to or above reaction temperatures before mixing them. However, highly heated, e.g., 1,000° C., titanium tetrachloride is extremely corrosive and handling it requires ceramic equipment which is fragile. Another method consists of burning a fuel, such as a carbonaceous combustible material, e.g., carbon or carbon monoxide, with oxygen, and bringing a mixture of the reactant gases having a temperature below reaction temperature, e.g., <500° C., into contact with the resulting flame. However, it has been found that combustibles containing metal halides are difficult to ignite because the metal halide present raises the ignition temperature of the combustion mixture considerably. Moreover, the flame once ignited tends to go out in the presence of liberated halogen, e.g., chlorine. A further method that has been employed is heating one of the reactant gases, e.g., oxygen, or an inert gas, e.g., nitrogen, with a heat source, such as a carbon monoxide flame or plasma arc heater, to temperatures in excess of the reaction temperature and thereafter admixing the thus heated reactant (oxygen) with the other reactant gas (TiCl$_4$), which is at a temperature less than reaction temperature, e.g., less than 500° C. When an inert gas is thus heated, it first is admixed with one reactant and the resulting admixture admixed with the other reactant. This method permits handling titanium halide in conventional metal equipment.

SUMMARY OF THE INVENTION

It has now been discovered that when oxygen is heated to temperatures substantially in excess of average titanium halide vapor phase reaction temperatures, e.g., 1,000° C., fixation of nitrogen present in the oxygen thus heated occurs. A product produced as a result of such fixation, which is believed to be nitric oxide, combines with the chlorine and titanium tetrachloride present in the reaction chamber to form addition product(s) which accumulate and obstruct the chlorine recovery zone. Such obstruction necessitates shutting down and cleaning the chlorine recovery zone which, in a continuous operation, requires shutting down the entire process.

It has now been discovered that products resulting from nitrogen fixation, namely nitric oxide, nitrosyl chloride and dinitrosyl titanium hexachloride, can be scrubbed from the gaseous reactor discharge product by contact with a liquid medium such as chlorine, titanium tetrachloride and inert chlorinated hydrocarbon solvents. It has further been discovered that the chlorine recovery zone which is obstructed with dinitrosyl titanium hexachloride can be cleared by heating the zone to at least 160° C.

BRIEF DESCRIPTION OF THE DRAWING

The single FIGURE is a schematic drawing of the chloride process for producing titanium dioxide through chlorine recovery.

DETAILED DESCRIPTION

In the production of titanium dioxide by vapor phase oxidation of titanium halide, e.g., titanium tetrachloride, with oxygen-containing gas, e.g., oxygen, the aforesaid reactants are brought to reaction temperature in a suitable reactor. Typically, reaction temperatures are above 500° C., more typically above 900° C. Although temperatures in portions of the reaction zone can reach 1,500° C. or more due to the heat of reaction, average reaction zone temperatures usually range between about 900° and about 1,200° C. Typical vapor phase oxidation processes are described in U.S. Letters Pat. No. 2,450,156 to Pechukas, No. 2,502,347 to Schaumann, No. 2,791,490 to Willcox, No. 2,760,275 to Olson et al., No. 2,968,529 to Wilson, No. 3,068,113 to Strain et al., and No. 3,069,281 to Wilson. Each of the aforesaid patents are incorporated herein, in toto, by reference.

In order to bring the reactants titanium tetrachloride and oxygen to reaction temperature, various techniques have been used. One such technique comprises heating the oxygen-containing gas to temperatures substantially above average reaction temperatures, introducing such heated oxygen into a suitable reactor where it is mixed with titanium tetrachloride having a temperature below reaction temperature. The aforesaid technique permits the use of titanium halide having a temperature below 500° C., e.g., from ambient temperature to 500° C., which use avoids the problems associated with handling highly heated titanium halide, which is highly corrosive to metal. On contact, the highly heated oxygen-containing gas increases the temperature of the titanium halide to reaction temperature instantaneously, thereby oxidizing the titanium halide to titanium dioxide.

In the above-described method, oxygen-containing gas, e.g., air, oxygen-enriched air or oxygen, is heated to temperatures substantially above average reaction temperatures, e.g., greater than 1,500 ° C., more often from 2,000° to 3,000° C., by any suitable heat source. For example, a carbonaceous combustible material, such as carbon monoxide or finely divided carbon, can be oxidized with excess oxygen to yield a hot gaseous stream comprising the combustion products of the combustible material and heated oxygen gas. The amount of excess oxygen used is sufficient to oxidize the amount of titanium halide charged to the reactor. See, for example, copending U.S. application Ser. No. 361,008, filed Apr. 20, 1964, for Edward M. Allen, now abandoned. Another technique that can be used is to heat oxygen by converting electrical energy into heat energy by means of an arc plasma or induction plasma heater. In the former, oxygen is passed between electrodes employed to conduct a discharge of electrical energy, i.e., an arc, which heats the oxygen as it passes through it. See, for example, copending U.S. application Ser. No. 618,538, filed Feb. 24, 1967, for William L. Wilson et al., now U.S. Pat. No. 3,475,123, issued Oct. 28, 1969. Still another technique comprises heating an inert gas, e.g., nitrogen, helium, argon, $CO_2$, with the aforementioned plasma heater, (plasma arc or induction plasma), and admixing oxygen-containing gas with the resulting plasma to heat the oxygen to temperatures substantially above reaction temperature. See, for example, U.S. Pat. No. 3,275,411.

The unexpected consequence of heating oxygen or oxygen-containing gas, which inevitably contains varying amounts of nitrogen, to temperatures substantially above average reaction temperatures is reaching the temperatures at which nitrogen fixation occurs. Although the exact temperature at which nitrogen fixation to nitric oxide occurs in the system described herein is not known, it is believed that in mixtures of nitrogen and oxygen containing minor amounts of nitrogen, e.g., <250 parts per million nitrogen, such fixation occurs in significant amounts as low as 1,700° C. Further, once fixation of the nitrogen present occurs, compounds resulting from such fixation, e.g., nitric oxide (NO), nitrogen dioxide ($NO_2$) and nitrosyl chloride (NOCl), can co-exist at temperatures as low as 125° C.

In the environment present after the vapor phase oxidation reactor, the products of nitrogen fixation such as NOCl combine with the titanium halide, such as titanium tetrachloride, to form addition product(s). Since the products of nitrogen fixation can exist in the system discussed at low temperatures, e.g., as low as 125° C., and since a small percentage of the titanium halide introduced into the reactor remains unreacted because of the thermodynamics of the vapor phase oxidation reaction, the addition product(s) referred to can be formed after the reactor, such as during cooling of the reactor discharge gas.

Turning now to the Figure accompanying the present description, there is shown a schematic of the chloride process for producing pigmentary titanium dioxide by vapor phase oxidation of titanium tetrachloride through chlorine recovery. More specifically, arrow 1 signifies the introduction of oxygen, usually at ambient temperatures, e.g., 60° F., to a heat source designated by the number 2, wherein it is heated to temperatures substantially above average reaction temperature. Arrow 4 indicates the passage of highly heated oxygen into reactor 8 where it is admixed with titanium tetrachloride which is introduced into reactor 8 as indicated by arrow 6. The reaction products of the vapor phase oxidation reaction are withdrawn from reactor 8 as indicated by arrow 10 and removed to cooling zone 12 wherein the reactor discharge is cooled to temperatures at which it can be handled easily by the apparatus in the gas-solid separation zone 16. Cooling of the reactor discharge in cooling zone 12 can be accomplished by various techniques, such as an indirect heat exchanger or by direct heat exchanger with previously cooled reactor discharge gas.

Cooled reactor discharge products are forwarded to a gas-solid separation zone 16 as indicated by arrow 14, such as bag collectors, wherein the titanium dioxide solid product is separated from the reactor discharge gas, as indicated by arrows 18 and 20 respectively. Reactor discharge product gas is then forwarded to scrubbing zone 28 wherein the reactor discharge gas is contacted with liquid scrubbing agent introduced into scrubbing zone 28, as indicated by arrow 27. Spent scrubbing agent is removed from scrubbing zone 28 as shown by arrow 29. The scrubbed reactor discharge gas is removed from scrubbing zone 28, as shown by arrow 21 and forwarded to chlorine recovery zone 22 wherein product chlorine and unreacted titanium tetrachloride are separated, as indicated by arrows 24 and 26 respectively. Chlorine recovery can be accomplished by any conventional technique, such as by liquefaction and fractional distillation. The titanium tetrachloride recovered can be recycled to the reactor or transferred to storage for later purification and reuse. Similarly, the chlorine recovered can be recycled directly to the reactor for use as dilution or temperature moderating gas, forwarded to a chlorination zone where titaniferous ore is chlorinated to titanium tetrachloride, or transferred to storage for purification and reuse in either the operations previously discussed or as desired.

Although the exact chemical composition of the aforesaid addition product(s) is not known, it is believed to consist in part of dinitrosyl titanium hexachloride ($TiCl_4 \cdot 2NOCl$). This addition compound is a yellow crystalline material having a strong affinity for water and subliming at between about 150° and 160° C. The aforesaid yellow crystalline material accumulates in the chlorine recovery zone where temperatures range from about −40° C. to about 185° F.

Commercially available oxygen, such as produced by the liquefaction and fractional distillation of air, is 99.5 percent oxygen. Such oxygen is reported to contain as little as 25 parts per million nitrogen; but, can contain more, e.g., as much as 250 parts per million nitrogen, and can contain greater than 1,000 parts per million nitrogen. Since a maximum nitrogen content specification is not specified by suppliers of oxygen, the nitrogen content thereof can vary widely. Upsets in the process for preparing commercial oxygen or outside contamination often increase the nitrogen content of the oxygen to in excess of 1,000 parts per million nitrogen, e.g., from 1,400 to 2,500 parts per million nitrogen. Air or oxygen-enriched air obviously contains substantially more than 250 parts per million nitrogen.

It has now been discovered that if the nitrogen content of the oxygen used to oxidize titanium tetrachloride is maintained at not greater than 100 parts per million, nitrogen fixation-chlorine-titanium tetrachloride addition product(s) are prevented or minimized and, if the latter, can be tolerated in the system, especially the chlorine recovery zone. Preferably, the nitrogen content of the oxygen used is less than 100 parts per million and most preferably is less than 50 parts per million nitrogen, e.g., from 25 to 50 parts per million nitrogen.

If the chlorine recovery zone becomes obstructed (plugged) with the nitrogen fixation-chlorine-titanium tetrachloride addition product(s), e.g., by using oxygen containing greater than 100 parts per million nitrogen, several techniques can be used to remove the obstruction. For example, the zone can be heated internally to temperatures of at least 160° C. with hot air, or other suitable substantially dry inert gases to sublime and remove the addition product(s). If the obstructed zone is jacketed, heating can be conducted externally. Alternatively, the zone can be flushed with inert chlorinated solvents such as titanium tetrachloride, carbon tetrachloride and perchloroethylene. By inert is meant that the solvent or gas is chemically compatible with the compounds in the zone and with the materials of construction from which the zone is fabricated.

In a further embodiment, it is contemplated scrubbing the reactor discharge gas stream to remove products resulting from nitrogen fixation, e.g., the aforesaid addition product, nitric oxide and nitrosyl chloride, from said gas stream before the chlorine recovery zone. Scrubbing can be accomplished with liquid chlorine, liquid titanium tetrachloride, and other liquid inert chlorinated hydrocarbon solvents such as carbon tetrachloride, perchloroethylene, and dichlorobenzene by any conventional scrubbing technique which provides intimate gas-liquid contact. Examples of suitable techniques include the use of a spray and packed columns and a stationary pool of the liquid solvent. If chlorinated solvents are used, other than $TiCl_4$, a further separation step may be required to produce pure chlorine and/or titanium tetrachloride.

The amount of scrubbing agent used can vary and is not critical. Sufficient scrubbing agent to accomplish removal and/or solution of the nitrogen fixation addition product should be used. Similarly, the temperature and pressure at which scrubbing is performed is not critical and will vary depending on the equipment and scrubbing agent used.

Another technique that can be employed to prevent obstruction of the chlorine recovery zone is to cool the gaseous reactor discharge product before the chlorine recovery zone to temperatures sufficient to precipitate the addition product(s) from the reactor discharge stream, e.g., temperatures of from −10° to −20° C.

The present process is more particularly described in the following examples which are intended as illustrative only

EXAMPLE I

Commercially purchased oxygen, which varied in nitrogen content from 100 to 800 parts per million nitrogen over a 24-hour period, was heated by a plasma arc heater to temperatures in excess of 2,000° C. and introduced into a suitable reactor wherein the heated oxygen was admixed with vaporous titanium tetrachloride. The reaction products were removed from the reactor, cooled below 100° C. and the titanium dioxide product separated from the gaseous portion of the reactor discharge. The cooled product gas was liquefied and distilled in a fractional distillation column wherein chlorine was separated from unreacted titanium tetrachloride. After less than 24 hours of operation, the distillation column was plugged with a yellow crystalline material. Infra-red, mass spectrometer and elemental analyses of the yellow material indicated that it was principally dinitrosyl titanium hexachloride (2NOXl · TiCl$_4$). Elemental analysis results were—Theoretical: Fixed nitrogen—8.1%, Titanium—14.9%, Chlorine—66.4%; Found (average): Fixed nitrogen—6.7%, Titanium—16.5 %, Chlorine—65.1%.

The column was segregated from the remainder of the system and hot air at a temperature of from about 200° to 260° C. was blown through the column. After about eight hours, the yellow crystalline material had disappeared.

EXAMPLE II

The process of Example I is repeated except that the cooled product gas prior to liquefaction and distillation is passed through a pool of titanium tetrachloride at ambient temperature. No evidence of plugging of the chlorine recovery column is found. Dinitrosyl titanium hexachloride is found in the pool of titanium tetrachloride and periodically removed.

While there are above described a number of specific embodiments of the present invention, it is obviously possible to produce other embodiments and various equivalent modifications thereof without departing from the spirit of the invention.

Having set forth the general nature and specific embodiments of the present invention, the scope thereof is now particularly pointed out in the appended claims.

We claim:

1. In the continuous process of producing pigmentary titanium dioxide by vapor phase reaction of reactants titanium tetrachloride and oxygen in a reactor wherein nitrogen-containing reactant oxygen is heated to temperatures at which fixation of nitrogen present therein occurs, titanium dioxide reactor product is separated from reactor product gas comprising chlorine and unreacted titanium tetrachloride, and reactor product gas is then forwarded to a chlorine recovery zone wherein said chlorine and unreacted titanium tetrachloride are separated by distillation, said reactor product gas containing addition products of nitrogen fixation, which addition products of nitrogen fixation cause plugging in said chlorine recovery zone, the improvement which comprises removing addition products of nitrogen fixation from reactor product gas by scrubbing reactor product gas with a member selected from the group consisting of liquid chlorine, liquid titanium tetrachloride and liquid inert chlorinated hydrocarbon solvents after separation of titanium dioxide product therefrom but before its introduction into said chlorine recovery zone, whereby to avoid said plugging.

2. The process of claim 1 wherein the chlorinated hydrocarbon solvents are carbon tetrachloride, perchloroethylene or dichlorobenzene.

3. The process of claim 1 wherein the reactor discharge gas is passed through a liquid pool of liquid chlorine or liquid titanium tetrachloride.

4. The process of claim 1 wherein reactant oxygen is heated to at least 1,700° C. and said reactor product gas contains dinitrosyl titanium hexachloride.

5. In the continuous process of producing pigmentary titanium dioxide by vapor phase reaction of reactants titanium tetrachloride and oxygen in a reactor wherein nitrogen-containing reactant oxygen is heated to temperatures greater than 1,500° C., titanium dioxide reactor product is separated from reactor product gas comprising chlorine and unreacted titanium tetrachloride, and reactor product gas is then forwarded to a chlorine recovery zone wherein said chlorine and unreacted titanium tetrachloride are separated by distillation, said reactor product gas containing dinitrosyl titanium hexachloride, which dinitrosyl titanium hexachloride causes plugging in said chlorine recovery zone, the improvement which comprises removing dinitrosyl titanium hexachloride from reactor product gas by scrubbing reactor product gas with a member selected from the group consisting of liquid chlorine, liquid titanium tetrachloride and liquid inert chlorinated hydrocarbon solvents after separation of titanium dioxide product therefrom but before its introduction into said chlorine recovery zone, whereby to avoid said plugging.

6. The process of claim 5 wherein the chlorinated hydrocarbon solvents are carbon tetrachloride, perchloroethylene or dichlorobenzene.

* * * * *